United States Patent
Boyd

(10) Patent No.: US 11,175,533 B2
(45) Date of Patent: Nov. 16, 2021

(54) LIGHT REDIRECTING FILM, BACKLIGHT, AND DISPLAY SYSTEM

(71) Applicant: 3M INNOVATIVE PROPERTIES COMPANY, St. Paul, MN (US)

(72) Inventor: Gary T. Boyd, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 17/041,028

(22) PCT Filed: Apr. 30, 2019

(86) PCT No.: PCT/IB2019/053540
§ 371 (c)(1),
(2) Date: Sep. 24, 2020

(87) PCT Pub. No.: WO2019/211752
PCT Pub. Date: Nov. 7, 2019

(65) Prior Publication Data
US 2021/0141272 A1 May 13, 2021

Related U.S. Application Data

(60) Provisional application No. 62/666,487, filed on May 3, 2018.

(51) Int. Cl.
*G02F 1/00* (2006.01)
*G02F 1/13357* (2006.01)

(52) U.S. Cl.
CPC .. *G02F 1/133606* (2013.01); *G02F 1/133603* (2013.01)

(58) Field of Classification Search
CPC ............... G02F 1/133606; G02F 1/133603
See application file for complete search history.

(56) References Cited

U.S. PATENT DOCUMENTS

| 4,374,077 A | 2/1983 | Kerfeld |
| 4,576,850 A | 3/1986 | Martens |

(Continued)

FOREIGN PATENT DOCUMENTS

| KR | 10-2013-0112522 | 10/2013 |
| WO | WO 2002-069030 | 9/2002 |

(Continued)

OTHER PUBLICATIONS

Seetzen, "A High Dynamic Range Display Using Low and High Resolution Modulators", SID Symposium Digest of Technical Papers, Jul. 2003, vol. 34, No. 1, pp. 1450-1453.

(Continued)

*Primary Examiner* — Gerald J Sufleta, II
(74) *Attorney, Agent, or Firm* — Clifton F. Richardson

(57) ABSTRACT

A light redirecting film, a backlight including the light redirecting film, and a display system including the backlight are described. The light redirecting film may be a microstructured film including a plurality of substantially parallel spaced apart structures on a substrate. The backlight includes a plurality of discrete spaced apart light sources configured to illuminate a plurality of non-overlapping illumination zones in a display surface in a one-to-one correspondence relationship; and a microstructured film disposed on the plurality of light sources, such that when the display surface is disposed on the microstructured film and the light sources are energized, at least 80% of light emitted by each light source illuminates a corresponding illumination zone in the display surface, and a luminous intensity distribution across the plurality of illumination zones has an average I and a standard deviation S, where S/I<1.

18 Claims, 7 Drawing Sheets

(56) References Cited

U.S. PATENT DOCUMENTS

| | | | |
|---|---|---|---|
| 5,175,030 A | 12/1992 | Lu | |
| 5,271,968 A | 12/1993 | Coyle | |
| 5,558,740 A | 9/1996 | Bernard | |
| 5,995,690 A | 11/1999 | Kotz | |
| 7,052,152 B2 | 5/2006 | Harbers | |
| 7,478,913 B2 | 1/2009 | Epstein | |
| 7,766,528 B2 | 8/2010 | Epstein | |
| 7,789,538 B2* | 9/2010 | Epstein | G02F 1/133606 362/333 |
| 7,997,771 B2 | 8/2011 | Epstein | |
| 8,690,373 B2* | 4/2014 | Epstein | G02F 1/133606 362/97.2 |
| 9,001,286 B2 | 4/2015 | Epstein | |
| 2004/0080938 A1* | 4/2004 | Holman | G02F 1/133605 362/231 |
| 2007/0047254 A1 | 3/2007 | Schardt | |
| 2007/0297747 A1 | 12/2007 | Biernath | |
| 2008/0049330 A1* | 2/2008 | Tolbert | G02F 1/133606 359/599 |
| 2008/0231780 A1* | 9/2008 | Graf | G02F 1/133606 349/112 |
| 2010/0027242 A1* | 2/2010 | Kishine | G02B 5/045 362/97.1 |
| 2011/0128302 A1 | 6/2011 | Cho | |
| 2011/0234942 A1* | 9/2011 | Nakagome | G02B 5/0231 349/64 |
| 2011/0292302 A1* | 12/2011 | Park | G02B 19/0014 348/739 |
| 2015/0301384 A1* | 10/2015 | Koike | G02F 1/13362 349/65 |
| 2018/0100963 A1* | 4/2018 | Boyd | G02B 6/0053 |
| 2019/0155105 A1* | 5/2019 | Aieta | G02F 1/133615 |
| 2020/0124834 A1* | 4/2020 | Woodgate | G02F 1/133603 |

FOREIGN PATENT DOCUMENTS

| | | |
|---|---|---|
| WO | WO 2010-059577 | 5/2010 |
| WO | WO 2017-204840 | 11/2017 |

OTHER PUBLICATIONS

International Search Report for PCT International Application No. PCT/IB2019/053540, dated Sep. 9, 2019, 4 pages.

* cited by examiner

LIGHT REDIRECTING FILM, BACKLIGHT, AND DISPLAY SYSTEM

CROSS REFERENCE TO RELATED APPLICATIONS

This application is a national stage filing under 35 U.S.C. 371 of PCT/IB2019/053540 filed Apr. 30, 2019, which claims the benefit of U.S. Provisional Patent Application No. 62/666,487, filed May 3, 2018, the disclosures of which are incorporated by reference in their entirety herein.

BACKGROUND

Liquid crystal displays (LCD) typically use a backlight to provide light to an LCD display panel. The contrast provided by the display is limited by the ability of the LCD display panel to block light from the backlight. High dynamic range (HDR) LCD displays may utilize local dimming to increase the contrast of the display.

SUMMARY

In some aspects of the present description, a backlight for providing uniform illumination to a display surface disposed on the backlight is provided. The backlight includes a plurality of discrete spaced apart light sources configured to illuminate a plurality of non-overlapping illumination zones in the display surface in a one-to-one correspondence relationship, and a first microstructured film disposed on and facing the plurality of light sources, such that when the display surface is disposed on the first microstructured film and the light sources are energized, at least 80% of light emitted by each light source illuminates a corresponding illumination zone in the display surface. A luminous intensity distribution across the plurality of the illumination zones has an average I and a standard deviation S, where S/I<1.

In some aspects of the present description, a light redirecting film is provided. The light redirecting film includes a plurality of substantially parallel spaced apart structures extending along a first direction and arranged side by side along an orthogonal second direction on a substrate. Each structure includes opposing curved facets meeting at a peak. The peak extends along the first direction. In a cross-section of the light redirecting film in a plane substantially perpendicular to the first direction: an average lateral spacing between neighboring peaks of the structures is P, an average lateral spacing between neighboring bases of the structures is W, and an average of best-fit radii of curvature to the curved facets of the structures is R, where $0.1 \leq W/P \leq 0.2$ and $0.6 \leq R/P \leq 1.1$. In some embodiments of the light redirecting film, the structures have an index of refraction n1 and the substrate has an index of refraction n2, where $n1 \geq 1.5$ and $n1-n2 \geq 0.02$.

In some aspects of the present description, a display system is provided. The display system includes a pixelated display surface, a two-dimensional array of discrete spaced apart light sources disposed behind the display surface, and a controller. The pixelated display surface includes a plurality of pixels and a plurality of non-overlapping illumination zones where each illumination zone includes at least 10 of the pixels. Each light source in the two-dimensional array of discrete spaced apart light sources is in a one-to-one correspondence with one of the illumination zones. The controller is for individually addressing each pixel and for individually energizing each light source, such that when energized, at least 80% of light emitted by each light source illuminates the illumination zone corresponding to the light source.

DETAILED DESCRIPTION

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

A high dynamic range (HDR) liquid crystal display (LCD) typically utilizes an array of light sources in a backlight to locally augment the range of brightness of the LCD panel. Light emitting diodes (LEDs) are a convenient light source for HDR backlights. In some cases, the cost of such displays is reduced by reducing the number of LEDs per unit area. However, the resulting distance or pitch between the LEDs can decrease the spatial uniformity of the backlight. Additional diffusers can be added to improve the uniformity in this case. However, this also increases cross-talk between different zones illuminated by different LEDs. It is also often desirable to minimize the thickness of LCDs, including the backlight, to values less than 5 mm, or even less for mobile displays (e.g., less than 2 mm). A desired goal is therefore to spread light from discrete light sources over a suitably wide area using low thickness optical elements to achieve a desired spatial uniformity without resulting in substantial undesired cross-talk between different illumination zones. According to some embodiments of the present description, microstructured light redirecting films are provided that allow a plurality of non-overlapping illumination zones having a desired size (e.g., 200 to 1000 pixels) to be illuminated with a desired uniformity of intensity (e.g., a luminous intensity distribution across the plurality of the illumination zones may have an average I and a standard deviation S, where S/I<1) and without substantial cross-talk between adjacent illumination zones (e.g., when the light sources are energized, at least 80% of light emitted by each light source may illuminate only the illumination zone corresponding to the light source). HDR displays, for example, incorporating such light redirecting films can provide improved spatial resolution of low and high brightness regions.

Figure 1:
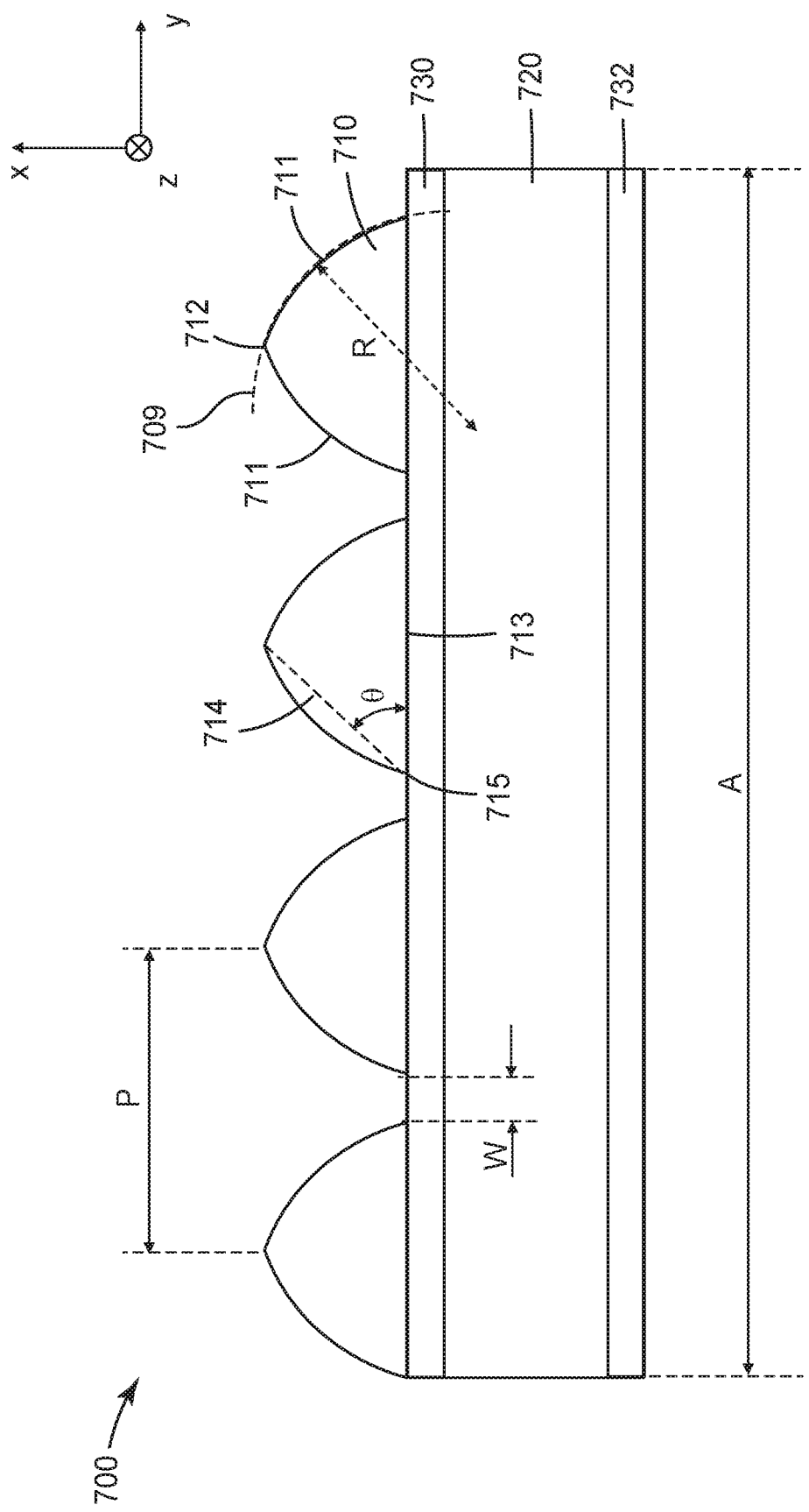
FIG. 1 is a schematic cross-sectional view of a light redirecting film.

FIG. 1 is a schematic cross-sectional view of a light redirecting film 700 including a plurality of substantially parallel spaced apart structures 710 extending along a first direction (z-direction referring to the x-y-z coordinate system depicted in FIG. 1) and arranged side by side along an orthogonal second direction (y-direction) on a substrate 720. The structures 710 may have at least one dimension less than 1 mm (e.g., a width of the structures 710 may be in a range of about 1 micrometer to about 500 micrometers) and so the structures 710 may be referred to as microstructures and the light redirecting film 700 may be referred to as a microstructured film.

In some embodiments, a backlight (e.g., an HDR backlight) includes one or more of the light redirecting films 700. In some embodiments, a display system includes the backlight including the one of more light redirecting films 700 or otherwise includes one or more of the light redirecting films 700. It is typically desirable in HDR backlights to isolate illumination zones defined by each discrete light source in order to minimize cross-talk. This can be achieved by a cutoff angle of the light redirecting films, where the output luminance abruptly decreases, forming a dark region between each discrete illumination zone. The cutoff angle is determined by the structure shape, its refractive index, the substrate refractive index, and any diffuse layers in the light redirecting films. Useful geometries and refractive indices for light redirecting film 700 are described elsewhere herein.

Each structure 710 includes opposing curved facets 711 meeting at a peak 712. The peak 712 extends along the first direction, such that in a cross-section of the light redirecting film in a plane (x-y plane as illustrated in FIG. 1) substantially perpendicular to the first direction: an average lateral spacing between the neighboring peaks of the structures is P; an average lateral spacing between neighboring bases 713 of the structures 710 is W, and an average of best-fit radii of curvature to the curved facets of the structures is R. The best-fit radius of curvature in a cross-section of a facet is the radius of a circle that minimizes the squared distance along a normal to the surface of the facet from the circle to the surface. An arc 709 of a best-fit circle is illustrated in FIG. 1. The best-fit radius of curvature can be determined using conventional least squares fitting techniques. In some embodiments, 0.1≤W/P≤0.2. In some embodiments, 0.6≤R/P≤1.1. In some embodiments, 15 micrometers ≤R≤25 micrometers. In some embodiments, in the cross-section of the light redirecting film in the plane substantially perpendicular to the first direction, a line 714 drawn from the peak 712 of each structure 710 to an end 715 of the base 713 of the structure 710 makes an angle θ with the base 713 in a range from about 30 degrees to about 60 degrees. In some embodiments, the structures 710 have an index of refraction n1 and the substrate 720 has an index of refraction n2, where n1≥1.5, and n1−n2≥0.02. In some embodiments, n1−n2≥0.05. In some embodiments, 1≥n1−n2≥0.02 or 0.5≥n1−n2≥0.02. Index of refraction refers to the index of refraction determined at 532 nm unless indicated differently.

In the illustrated embodiment, the light redirecting film 700 includes first and second layers 730 and 732 disposed on opposite major surfaces of substrate 720. In other embodiments, one or both of the first and second layers 730 and 732 may be omitted. In some embodiments, one or both of the first and second layers 730 and 732 is an optical diffuser which may be any optical diffuser described further elsewhere herein. In some embodiments, the second layer 732 is an adhesive layer and the first layer 730 is an optical diffuser or is optionally omitted. The adhesive layer may be an optical diffuser (e.g., an optically clear adhesive including a plurality of particles dispersed therein where the particles and the adhesive material have a refractive index difference of at least 0.01, or at least 0.03, for example).

The light redirecting film 700 has a total area A which refers to the area of the light redirecting film 700 in y-z plane (e.g., a length of the film times a width of the film). In some embodiments, one or more light redirecting films 700 is included in a backlight of a display system having a viewing area and the area A of the light redirecting film 700 is at least as large as the viewing area of the display system.

In some embodiments, the structures 710 include convex facets 711 as illustrated in FIG. 1 and in some embodiments, the structures 710 include concave facets. In some embodiments, a display system or backlight includes two (or more) light redirecting films 700 and the structures of one of the films have convex facets and the structures of another of the films has concave facets. In some embodiments, the light redirecting film includes additional structures between adjacent structures 710. For example, concave or convex structures substantially smaller than the structures 710 may be disposed between neighboring bases 713. As another example, a diffuser (e.g., diffusive surface structure or diffusive coating) may be disposed between neighboring bases 713. Utilizing additional structures or diffusers between adjacent structures 710 can further improve the uniformity of a backlight including one or more of the light redirecting films 700. For example, when two crossed light redirecting films 700 are included in a backlight, an output image of a light source in an illumination zone is formed by regions where light passes through structures 710 in both films, regions where light passes through structures 710 in one film and in spaces between structures 710 in the other film, and regions where light passes through spaces between structures 710 in both films. By selecting appropriate additional structures or diffusers between adjacent structures 710, the relative intensities of these regions can be adjusted to give an improved uniformity in the illumination zone.

Figure 2A:
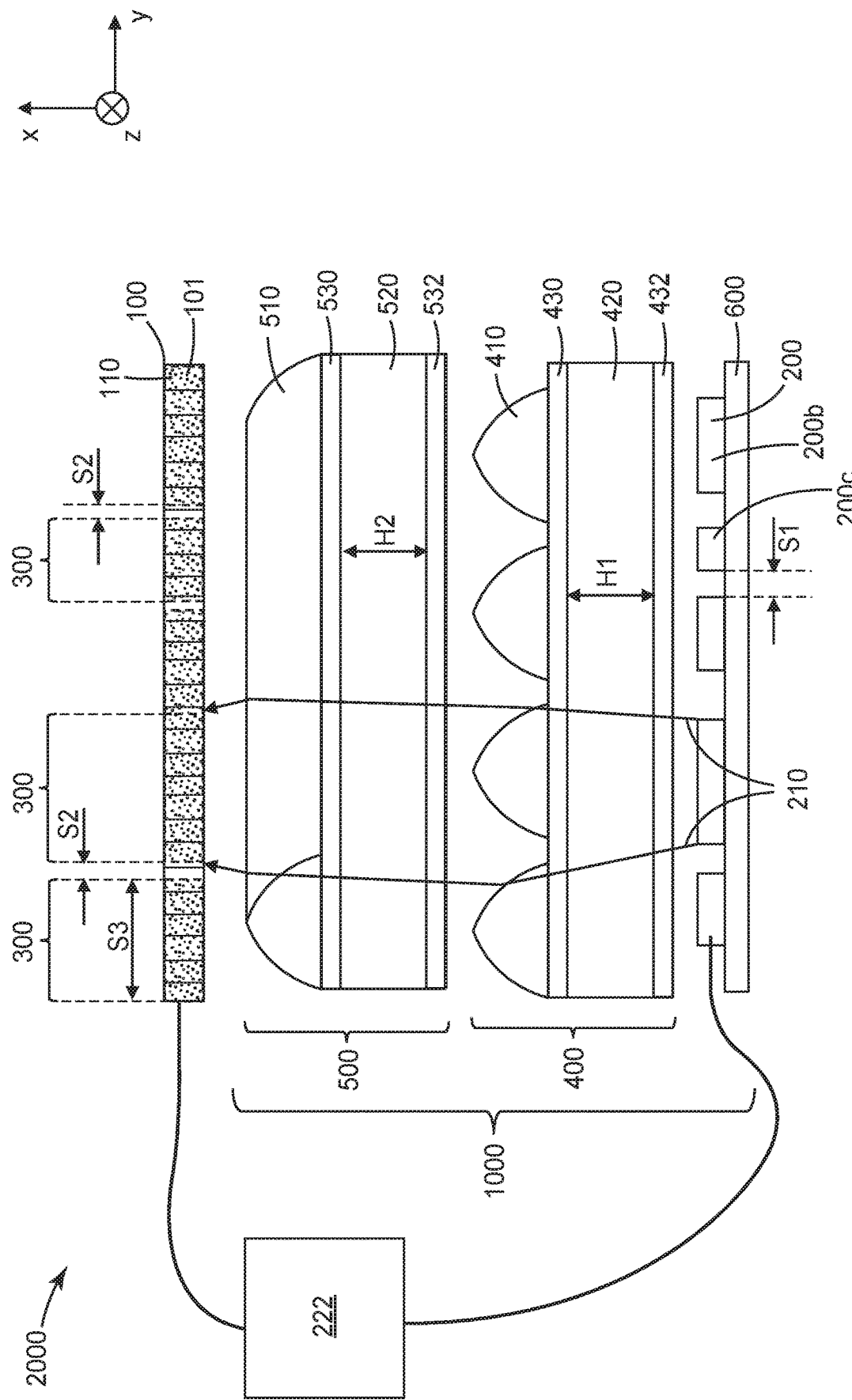
FIG. 2A is a schematic exploded view of a display system including a backlight.

FIG. 2A is a schematic exploded view of a display system 2000 including a backlight 1000 for providing uniform illumination to a display surface 100 disposed on the backlight 1000. The display surface 100 is pixelated and includes a plurality of pixels 110. In some embodiments, the plurality of pixels 110 are individually addressable. In the illustrated embodiment, the display surface 100 is a display surface of a display panel 101, which may be a liquid crystal display panel. The backlight 1000 includes a plurality of discrete spaced apart light sources 200 configured to illuminate a plurality of non-overlapping illumination zones 300 in the display surface 100 in a one-to-one correspondence relationship; and a first microstructured film 400 disposed on and facing the plurality of light sources 200. In the illustrated embodiment, the backlight 1000 further includes a second microstructured film 500 disposed on the first microstructured film 400. Either or both of the first and second microstructured films 400 and 500 may be a light redirecting film corresponding to light redirecting film 700, for example.

The various components are schematically illustrated as separated in the exploded view of FIG. 2A. It will be understood that the various components may be disposed on and one another so that adjacent components contact each other. A film may be described as facing the plurality of light sources 200, for example, if a major surface of the film generally faces the plurality of light sources 200. For example, the first microstructured film 400 is disposed on and faces the plurality of light sources 200. In the illustrated embodiment, the first microstructured film 400 includes first structures 410 and a first substrate 420 where the first substrate 420 is disposed between the first structures 410 and the light sources 200. The backlight 1000 includes a second microstructured film 500 disposed on the first microstructured film 400 where the first microstructured film 400 is disposed between the second microstructured film 500 and the plurality of light sources 200. In the illustrated embodiment, the second microstructured film 500 includes second structures 510 and a second substrate 520 where the second substrate 520 is disposed between the second structures 510 and the first structures 410.

Other shapes and spacings of the first and second structures 410 and 510 may be utilized. The shape and spacing of the first and second structures 410 and 510 are preferably selected to provide a desired degree of uniformity in the luminous intensity distribution across each illumination zone 300 while confining most (e.g., at least 80%) of light 210 emitted by each light source 200 to the corresponding illumination zone 300. It has been found that suitable exemplary geometries that provide these results include first and second microstructured films 400 and 500 with first and second structures 410 and 510 facing away from the light sources 200 and with geometries as described for light redirecting film 700, for example. An average lateral spacing between the light sources 200 is S1. In some embodiments, S1 is selected such that when the light sources 200 are energized, a desired degree of uniformity in the luminous intensity distribution across the plurality of illumination zones 300 is achieved. In some embodiments, when the display surface 100 is disposed on the first microstructured film 400 and the light sources 200 are energized, at least 80% of light 210 emitted by each light source 200 illuminates a corresponding illumination zone 300 in the display surface 100, and a luminous intensity distribution across the plurality of the illumination zones 300 has an average I and a standard deviation S, where $S/I<1$, or $S/I<0.8$, or $S/I<0.7$. For example, in some embodiments, S/I is in a range of 0.2 to 0.8 or to 0.7. In some embodiments, when the display surface 100 is disposed on the first microstructured film 400 and the light sources 200 are energized, a luminous intensity distribution across each illumination zone 300 has an average Iz and a standard deviation Sz, where $Sz/Iz<0.8$, or $Sz/Iz<0.6$, or $Sz/Iz<0.5$, or $Sz/Iz<0.4$. For example, in some embodiments, each Sz/Iz is in a range of 0.2 to 0.5 or to 0.4.

The first and second microstructured films 400 and 500 can be selected (e.g., selecting the materials of the structures and substrates to have desired refractive indices, selecting various geometric parameters of the structures, or the thickness of the substrates) to give a desirably low S/I and/or Sz/Iz. The first substrate 420 has a thickness H1 and the second substrate 520 has a thickness H2. In some embodiments, a ratio of the thickness H2 of the second substrate to the thickness H1 of the first substrate is less than 2, or less than 1, or less than 0.5. In some embodiments, $0.01<H2/H1<1$ or $0.02<H2/H1<0.5$.

A backlight 1000 was modeled where each of the first and second microstructured films 400 and 500 were as described for light redirecting film 700. The spacing P between neighboring peaks was taken to be 24 micrometers, the angle θ was taken to be 45 degrees, the radius of curvature R of the facets was taken to be 16.7 micrometers, and the spacing W between neighboring bases was taken to be 4 micrometers. The refractive indices n1 and n2 of the structures and substrates were taken to be 1.64 and 1.61, respectively. The light source was taken to have an emission area of 200 micrometers by 200 micrometers and the illumination zone was taken to be 1 mm by 1 mm. The substrate thickness H2 of the second microstructured film 500 was taken to be 50 micrometers and the substrate thickness H1 of the first microstructured film 400 was taken to be 750 micrometers. Sz/Iz was determined to be 0.25. For comparison, Sz/Iz was determined without the first and second microstructured films 400 and 500 in place and found to be 3.65. Thus, Sz/Iz was substantially reduced by including the first and second microstructured films 400 and 500.

FIGS. 3-6 are plots of standard deviation in intensity divided by average intensity (SDA) for the backlight 1000 as functions of R, W/P, n1 (for fixed n2), and H2/H1, respectively, determined by modeling. The results show that the SDA has a minimum for a certain R and W/P, that lowering H2/H1 generally lowers the SDA, and that increasing the index of refraction of the structure n1 for a given index of refraction n2 of the substrate (in this case n2=1.61), decreases the SDA. In some embodiments, microstructured films useful for providing a low SDA had $0.1 \leq W/P \leq 0.2$, $0.6 \leq R/P \leq 1.1$, $n1 \geq 1.5$, and $n1-n2 \geq 0.02$. The SDA was determined for a single light source and single illumination zone as described above and so corresponds to Sz/Iz. A plurality of light sources and illumination zones can be arrayed so that adjacent illumination zones are close to one another. In this case, the SDA values will approximate S/I. However, S/I may be somewhat larger than Sz/Iz due to gaps between adjacent illumination zones which have a lower luminous intensity than the illumination zones.

Figure 2B:
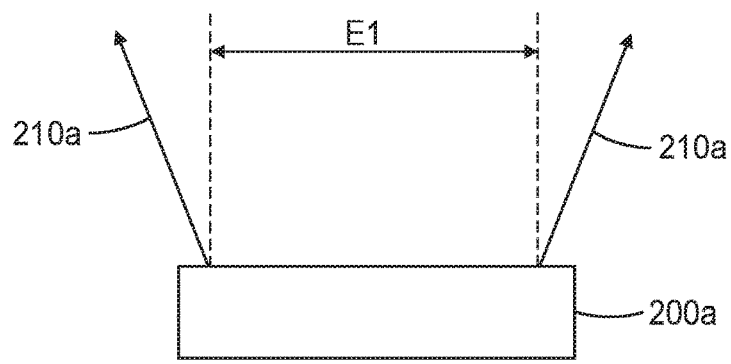
FIG. 2B is a schematic cross-sectional view of a light source included in the display system of FIG. 2A.
Figure 2C:
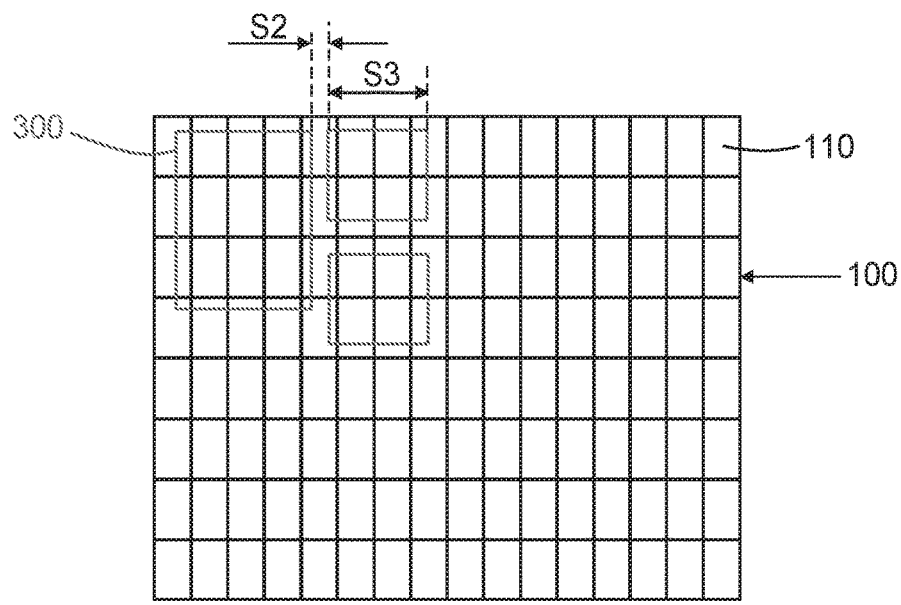
FIG. 2C is a schematic top view of a display surface included in the display system of FIG. 2A.

FIG. 2B is a schematic cross-sectional view of a light source 200a in the plurality of discrete spaced apart light sources 200 included in the backlight 1000. The light source 200a has an emission area E1 and emits a light 210a. The plurality of light sources 200 has a total emission area E which is a sum of the emission areas E1. The first microstructured film 400 has a total area of A where the total area of the microstructured film 400 refers to the area in the y-z plane. In some embodiments, $0.9<A/E<2$. In some embodiments, the first microstructured film 400 extends over the total emission area E and $1<A/E$. In some embodiments, $A/E<1.9$ or $A/E<1.8$. FIG. 2C is a schematic top view of the display surface 100. The average lateral spacing between the illumination zones S2 and the average lateral dimension of the illumination zones S3 are illustrated. In some embodiments, $S2/S3<0.1$. For example, S2/S3 may be in a range of 0.005 or 0.01 to 0.1 or 0.08. In some embodiments, S2/S1≤10. For example, S2/S1 may be in a range of 0.1 or 0.5 to 10 or 8. In FIG. 2C, the illumination zones 300 are schematically shown as including a relatively small number of pixels 110, but significantly more pixels 110 may be included in each illumination zone 300. For example, each illumination zone 300 may include at least 10 pixels, or at least 50 pixels, or at least 100 pixels, or at least 200 pixels. Utilizing a larger number of pixels in each illumination zone 300 allows fewer light sources 200 to be utilized which may be desired. It has been found that the first and second microstructured films 400 and 500 can be selected such that each illumination zone 300 is substantially filled with suitably uniform light from a corresponding light source 200 when a relatively large illumination zone 300 is utilized. However, utilizing larger illumination zones 300 decreases the resolution in lighting intensity variation provided by the plurality of illumination zones 300 and this may not be desired. Accordingly, in some embodiments, the number of pixels in each illumination zone is no more than 10000, or no more than 5000, or no more than 2000, or no more than 1000. In some embodiments, each illumination zone 300 includes between 200 and 1000 pixels 110. Each of the pixels 110 may include a plurality of colored subpixels. For example, each pixel 110 may include a red subpixel, a green subpixel, and a blue subpixel.

In the embodiment illustrated in FIG. 2A, the first microstructured film 400 further includes first and second layers 430 and 432 disposed on opposing sides of the substrate 420. One or both of the first and second layers 430 and 432 may optionally be omitted. In some embodiments, one or both of the first and second layers 430 and 432 is an optical diffuser for diffusing light emitted by the plurality of light sources. In some embodiments, the optical diffuser has an average diffuse reflectance in a range from about 1% to about 5%. In some embodiments, the optical diffuser has an average diffuse transmittance of greater than about 80% and an average specular transmittance of less than about 10%. In some embodiments, a ratio of an average diffuse transmittance of the optical diffuser to an average specular transmittance of the optical diffuser is greater than about 10. In some embodiments, the optical diffuser has an optical haze of at least 5%.

Figure 7:
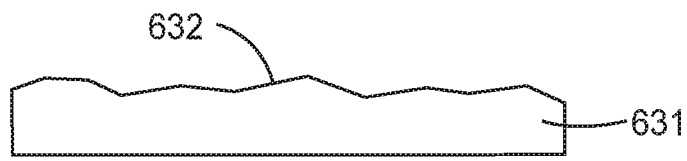
FIGS. 7-8 are schematic cross-sectional views of optical diffusers.
Figure 8:
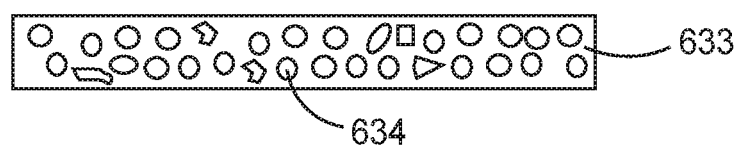

In some embodiments, the optical diffuser is primarily a surface diffuser comprising a microstructured surface. FIG. 7 is a schematic cross-sectional view of an optical diffuser 631 which is primarily a surface diffuser and which has a microstructured surface 632. In some embodiments, the optical diffuser is primarily a volume diffuser. FIG. 8 is a schematic cross-sectional view of an optical diffuser 633 which is primarily a volume diffuser and which includes particles 634 dispersed therein. For example, the particles 634 may be dispersed in an adhesive having a different refractive index from the particles as described further elsewhere herein. An optical diffuser may be described as primarily a surface diffuser if greater than 50 percent of normally incident light scattered by the diffuser is scattered by surface structures of the diffuser. In some embodiments, at least 60%, or at least 70%, or at least 80%, or at least 90% of normally incident light scattered by an optical diffuser is scattered by surface structures of the diffuser. An optical diffuser may be described as primarily a volume diffuser if greater than 50 percent of normally incident light scattered by the diffuser is scattered in the volume of the diffuser (e.g., scattered by particles dispersed in the volume of the diffuser). In some embodiments, at least 60%, or at least 70%, or at least 80%, or at least 90% of normally incident light scattered by an optical diffuser is scattered in the volume of the diffuser.

Figure 9A:
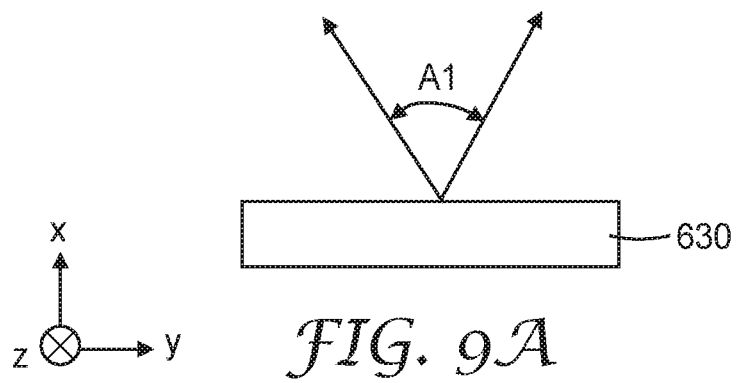
FIGS. 9A-9B are schematic cross-sectional views illustrating an optical diffuser scattering light in a first direction with a first viewing angle and in a second direction orthogonal to the first direction with a second viewing angle.
Figure 9B:
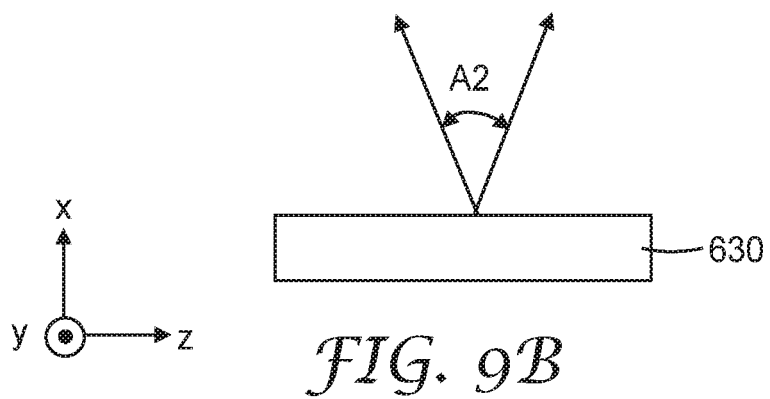

In some embodiments, the optical diffuser scatters light in a first direction (e.g., in x-y plane) with a first viewing angle A1 and in a second direction (e.g., in x-z plane) orthogonal to the first direction with a second viewing angle A2. For example, the optical diffuser may correspond to optical diffuser 630 schematically illustrated in FIGS. 9A-9B. Light is taken to be normally incident on the optical diffuser 630 and transmitted through the optical diffuser 630 within the illustrated viewing angles which may the full width at half maximum (FWHM) viewing angles. In some embodiments, a difference between A1 and A2 is less than 5 degrees. In some embodiments, a difference between A1 and A2 is greater than 5 degrees. A difference between A1 and A2 can be obtained by using a diffuser having asymmetric surface structures, for example, or by using asymmetric particles in a film that is at least partially oriented by stretching, for example. In some embodiments, the optical diffuser is disposed between the light sources 200 and the substrate 420 (e.g., layer 432 may be the optical diffuser). In some embodiments, the substrate 420 is disposed between the light sources 200 and the optical diffuser (e.g., layer 430 may be the optical diffuser).

Figure 2D:
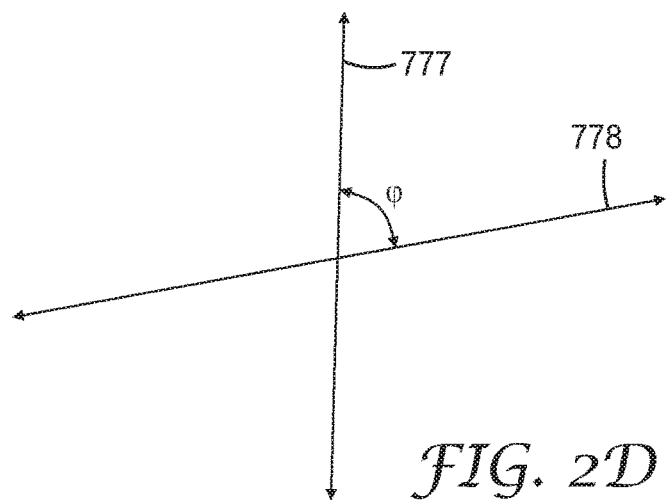
FIG. 2D is a schematic top view illustrating first and second directions along which microstructures of respective first and second microstructured films included in the display system of FIG. 2A extend.
Figure 3:
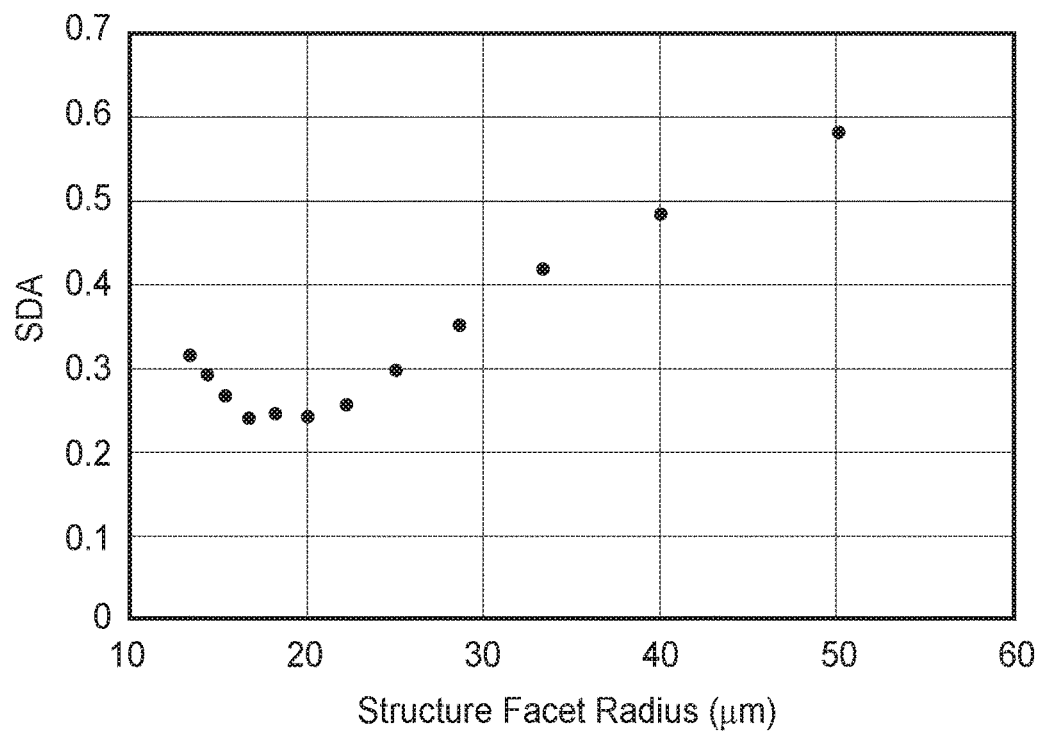
FIG. 3 is a plot a standard deviation in intensity divided by average intensity for a backlight including a light redirecting film having structures with curved facets as a function of an average best-fit radius of curvature R of the curved facets.
Figure 4:
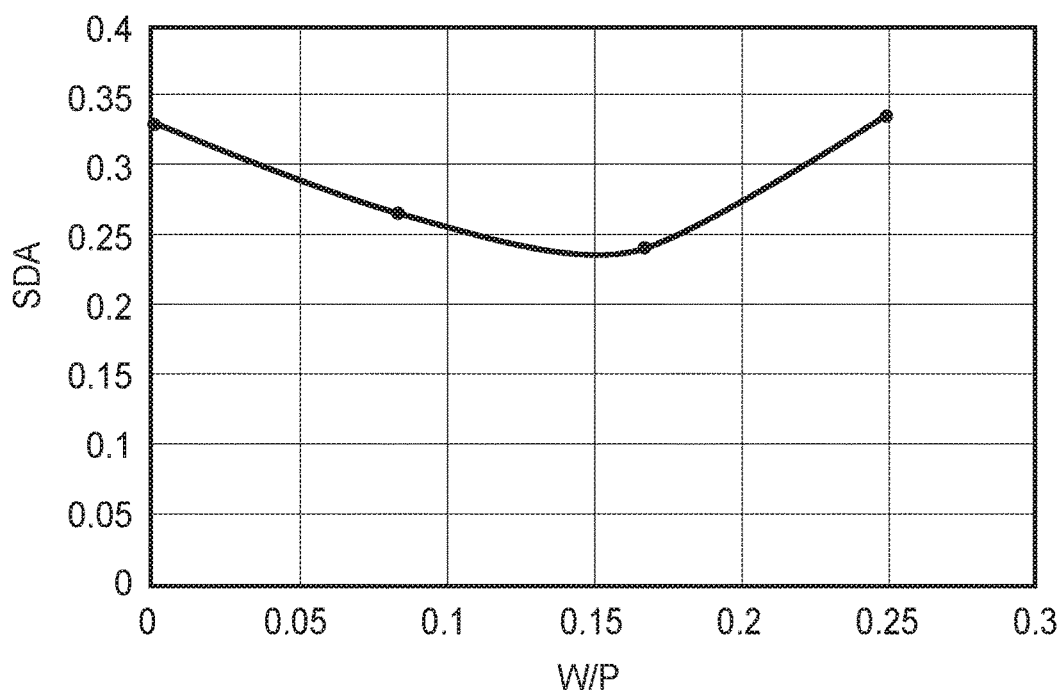
FIG. 4 is a plot a standard deviation in intensity divided by average intensity for a backlight including a light redirecting film having structures as a function of W/P where W is an average lateral spacing between neighboring bases of the structures and P is an average lateral spacing between the neighboring peaks of the structures.
Figure 5:
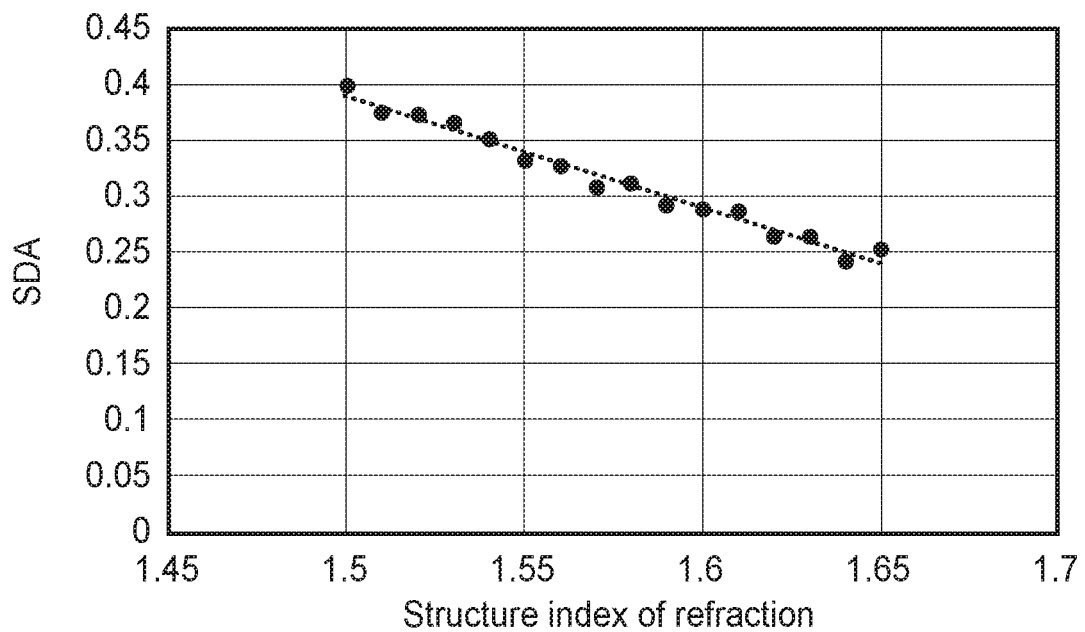
FIG. 5 is a plot a standard deviation in intensity divided by average intensity for a backlight including a light redirecting film having structures disposed on a substrate as a function of the index of refraction of the structures.
Figure 6:
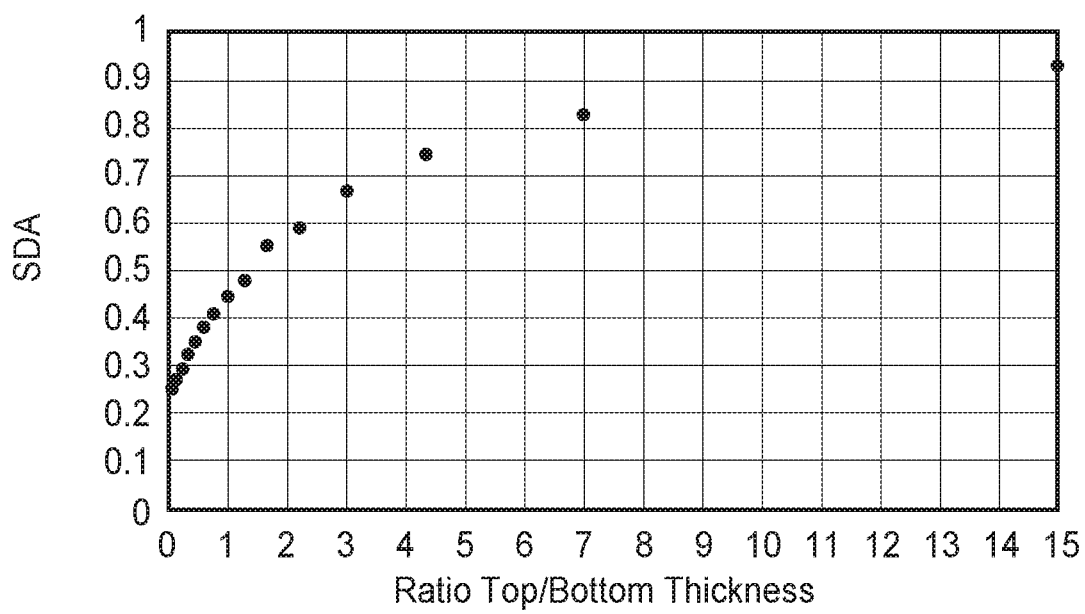
FIG. 6 is a plot a standard deviation in intensity divided by average intensity for a backlight including a second light redirecting film disposed on a first light redirecting film as a function of the ratio of thicknesses of substrates of the second and first light redirecting films.

In the embodiment illustrated in FIG. 2A, a second microstructured film 500 is disposed on the first microstructured film 400. The first microstructured film 400 is disposed between the second microstructured film 500 and the plurality of light sources 200 and includes a plurality of substantially parallel spaced apart first structures 410 extending along a first direction (along or approximately along the z-direction of FIG. 2A or along first direction 777 of FIG. 2D) and disposed on a first substrate 420. The second microstructured film 500 includes a plurality of substantially parallel spaced apart second structures 510 extending along a second direction (e.g., along or approximately along the y-direction of FIG. 2A or along second direction 778 of FIG. 2D) and disposed on a second substrate 520. In some embodiments, an angle φ between the first and second directions 777 and 778 schematically illustrated in FIG. 2D is greater than about 70 degrees and less than about 110 degrees. In some embodiments, the angle φ is greater than about 80 degrees and less than about 100 degrees. In some embodiments, the angle φ is about 90 degrees. The first microstructured film 400 is disposed between the second microstructured film 500 and the plurality of light sources 200. The second substrate 520 is disposed between the second structures 510 and the first structures 410. In some embodiments, the second microstructured film 500 further includes first and second layers 530 and 532 disposed on opposing sides of the substrate 520. First and second layers 530 and 532 may be as described for first and second layers 430 and 432.

In some embodiments, at least one light source in the plurality of plurality of discrete spaced apart light sources 200 is a light emitting diode (e.g., the light source 200a depicted in FIG. 2B may be a light emitting diode). In some embodiments, at least one light source in the plurality of plurality of discrete spaced apart light sources 200 emits blue light. In some embodiments, at least one light source in the plurality of plurality of discrete spaced apart light sources 200 emits red light. In some embodiments, at least one light source in the plurality of plurality of discrete spaced apart light sources 200 emits green light. In some embodiments, at least one light source in the plurality of plurality of discrete spaced apart light sources emits white light. For example, light 210*a* emitted by the light source 200*a* depicted in FIG. 2B may be blue light, red light, green light, or white light. In some embodiments, each of the light sources 200 are blue light emitting diodes and a phosphor film is included to convert portions of the blue light into red and green light such that the light transmitted through the phosphor film is white light. In some embodiments, the phosphor film is placed between the first microstructured film 400 and the plurality of light sources 200. In other embodiments, the phosphor film is placed between the second microstructured film 500 and the display surface 100 or between the first and second microstructured films 400 and 500.

In some embodiments, each light source in the plurality of plurality of discrete spaced apart light sources 200 is placed directly behind and facing the first microstructured film 400. In some embodiments, the light sources 200 are disposed on a back reflector 600 for reflecting light emitted by the light sources 200 toward the first microstructured film 400. In some embodiments, at least one light source (e.g., light source 200*b*) in the plurality of plurality of discrete spaced apart light sources 200 is larger than at least one other light source (e.g., light source 200*c*) in the plurality of plurality of discrete spaced apart light sources 200. In other embodiments, the light sources in the plurality of plurality of discrete spaced apart light sources 200 are substantially the same size (e.g., all of the light sources may have a same size as light source 200*b*). Utilizing the back reflector 600 has been found to improve uniformity (decreased SDA) and increase average brightness.

In some embodiments, each of the light sources 200 is individually energizable. In some embodiments, the display system 2000 includes a controller 222 for individually addressing each pixel 110 and for individually energizing each light source 200. The controller 222 may be adapted to provide local dimming where light sources associated with darker regions of a displayed image are dimmed relative to light sources associated with brighter regions of the displayed image. Useful local dimming control circuits that can be included in the controller 222 are known in the art and include those described in U.S. Pat. Appl. Publ. No. 2011/0128302 (Cho et al.), for example.

Figure 10:
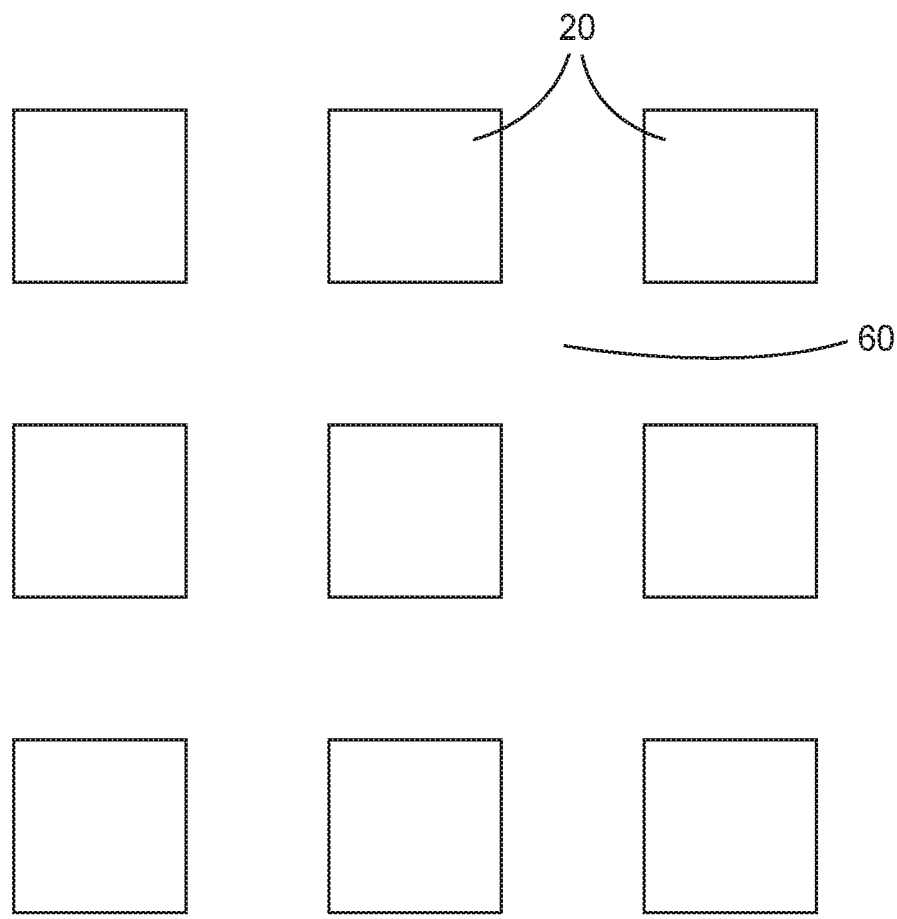
FIG. 10 is a schematic top view of a two-dimensional array of discrete spaced apart light sources.

The plurality of light sources 200 may be arranged in a two-dimensional array which may be a periodic array (e.g., on a square lattice or a triangular lattice). FIG. 10 is a schematic top view of a two-dimensional array of discrete spaced apart light sources 20 which may be disposed behind a display surface. A reflective material 60, which may be diffusely or specularly reflective, may be disposed between the light sources 20. For example, the light sources 20 may be disposed on a back reflector so that portion of the back reflector between the light sources 20 provide the reflective material. In some embodiments, the light sources are disposed on a printed circuit board and a white ink is printed in the areas between the light sources 20 to provide the reflective material 60. It has been found that using a reflective material 60 decreases the SDA and increases an average brightness of a display system incorporating the two-dimensional array of discrete spaced apart light sources 20.

The films of the present description can be made by any suitable process. In some embodiments, microstructures are produced on a substrate by a cast and cure process or by any other suitable microreplication process. In embodiments where an optical diffuser layer is included, the optical diffuser can be applied as a coating (e.g., a beaded diffuser coating) to one or both sides of the substrate prior to forming light redirecting microstructures. Alternatively, an optical diffuser can be produced by microstructuring a surface of the substrate opposite the surface on which the light redirecting microstructures are formed, for example. The light redirecting microstructures and/or optically diffusing microstructures can be made using a tool having a suitably structured surface. The tool can be formed by a diamond turning process. The structured surface can then be formed in a continuous cast and cure process where a resin is cast against the tool and cured, for example, with actinic (e.g., ultraviolet (UV)) radiation or heat. Examples of continuous cast and cure processes are described in the following patents: U.S. Pat. Nos. 4,374,077; 4,576,850; 5,175,030; 5,271,968; 5,558,740; and 5,995,690.

Any suitable materials can be used for the substrate or for the microstructures. In some embodiments, the substrate is a polymethyl methacrylate (PMMA) film, a polycarbonate film, or a polyethylene terephthalate (PET) film, for example. In some embodiments, the light redirecting microstructures are formed from a UV curable resin such as an acrylate, for example.

The following is a list of exemplary embodiments of the present description.

Embodiment 1 is a backlight for providing uniform illumination to a display surface disposed on the backlight, the backlight including:
a plurality of discrete spaced apart light sources configured to illuminate a plurality of non-overlapping illumination zones in the display surface in a one-to-one correspondence relationship; and
a first microstructured film disposed on and facing the plurality of light sources, such that when the display surface is disposed on the first microstructured film and the light sources are energized, at least 80% of light emitted by each light source illuminates a corresponding illumination zone in the display surface, and a luminous intensity distribution across the plurality of the illumination zones has an average I and a standard deviation S, S/I<1.

Embodiment 2 is the backlight of Embodiment 1, where the display surface is a pixelated surface including a plurality of pixels.

Embodiment 3 is the backlight of Embodiment 2, where the pixels are individually addressable.

Embodiment 4 is the backlight of Embodiment 2, where each illumination zone includes between 200 and 1000 pixels.

Embodiment 5 is the backlight of Embodiment 1, where each light source in the plurality of plurality of discrete spaced apart light sources is placed directly behind and faces the first microstructured film.

Embodiment 6 is the backlight of Embodiment 1, where an average lateral spacing between the light sources is S1, an average lateral spacing between the illumination zones is S2, S2/S1≤10.

Embodiment 7 is the backlight of Embodiment 1, where the plurality of light sources has a total emission area E, a total area of the first microstructured film is A, 0.9<A/E<2.

Embodiment 8 is the backlight of Embodiment 1, where an average lateral spacing between adjacent illumination zones is S2, and average lateral dimension of the illumination zones is S3, S2/S3≤0.1.

Embodiment 9 is the backlight of Embodiment 1, where the first microstructured film includes a plurality of substantially parallel spaced apart first structures extending along a first direction and arranged side by side along an orthogonal second direction on a first substrate, each first structure including opposing curved facets meeting at a peak, the peak extending along the first direction, the first substrate disposed between the first structures and the light sources.

Embodiment 10 is the backlight of Embodiment 9, where the first microstructured film further includes an optical diffuser for diffusing light emitted by the plurality of light sources.

Embodiment 11 is the backlight of Embodiment 10, where the optical diffuser has an average diffuse reflectance in a range from about 1% to about 5%.

Embodiment 12 is the backlight of Embodiment 10, where the optical diffuser has an average diffuse transmittance of greater than about 80% and an average specular transmittance of less than about 10%.

Embodiment 13 is the backlight of Embodiment 10, where a ratio of an average diffuse transmittance of the optical diffuser to an average specular transmittance of the optical diffuser is greater than about 10.

Embodiment 14 is the backlight of Embodiment 9 further including a second microstructured film disposed on the first microstructured film, the first microstructured film disposed between the second microstructured film and the plurality of light sources.

Embodiment 15 is the backlight of Embodiment 14, where the second microstructured film includes a plurality of substantially parallel spaced apart second structures extending along the second direction and arranged side by side along the first direction on a second substrate, each second structure including opposing curved facets meeting at a peak, the peak extending along the second direction, the second substrate disposed between the second structures and the first structures.

Embodiment 16 is the backlight of Embodiment 1 further including a second microstructured film disposed on the first microstructured film, the first microstructured film disposed between the second microstructured film and the plurality of light sources and including a plurality of substantially parallel spaced apart first structures extending along a first direction and disposed on a first substrate, the second microstructured film including a plurality of substantially parallel spaced apart second structures extending along a second direction and disposed on a second substrate, an angle between the first and second directions greater than about 70 degrees and less than about 110 degrees.

Embodiment 17 is the backlight of Embodiment 1, such that when the display surface is disposed on the first microstructured film and the light sources are energized, a luminous intensity distribution across each illumination zone has an average Iz and a standard deviation Sz, Sz/Iz<0.8.

Embodiment 18 is a light redirecting film, including:
a plurality of substantially parallel spaced apart structures extending along a first direction and arranged side by side along an orthogonal second direction on a substrate, each structure including opposing curved facets meeting at a peak, the peak extending along the first direction, such that in a cross-section of the light redirecting film in a plane substantially perpendicular to the first direction:
an average lateral spacing between neighboring peaks of the structures is P;
an average lateral spacing between neighboring bases of the structures is W, $0.1 \leq W/P \leq 0.2$; and
an average of best-fit radii of curvature to the curved facets of the structures is R, $0.6 \leq R/P \leq 1.1$. The structures have an index of refraction n1, the substrate has an index of refraction n2, $n1 \geq 1.5$, $n1-n2 \geq 0.02$.

Embodiment 19 is the light redirecting film of Embodiment 18, where $15 \leq R \leq 25$ micrometers.

Embodiment 20 is the light redirecting film of Embodiment 18, where in the cross-section of the light redirecting film in the plane substantially perpendicular to the first direction, a line drawn from the peak of each structure to an end of a base of the structure makes an angle with the base in a range from about 30 degrees to about 60 degrees.

Embodiment 21 is a backlight for providing uniform illumination to a display surface disposed on the backlight, the backlight including:
a plurality of discrete spaced apart light sources configured to illuminate a plurality of non-overlapping illumination zones in the display surface in a one-to-one correspondence relationship; and
the light redirecting film of any one of Embodiments 18 to 20 disposed on and facing the plurality of light sources, such that when the display surface is disposed on the light redirecting film and the light sources are energized, at least 80% of light emitted by each light source illuminates a corresponding illumination zone in the display surface, and a luminous intensity distribution across the plurality of the illumination zones has an average I and a standard deviation S, S/I<1.

Embodiment 22 is a display system including:
a pixelated display surface including a plurality of pixels and a plurality of non-overlapping illumination zones, each illumination zone including at least 10 of the pixels;
a two-dimensional array of discrete spaced apart light sources disposed behind the display surface, each light source in a one-to-one correspondence with one of the illumination zones; and a controller for individually addressing each pixel and for individually energizing each light source, such that when energized, at least 80% of light emitted by each light source illuminates the illumination zone corresponding to the light source.

Embodiment 23 is the display system of Embodiment 22 further including a backlight, the backlight including the two-dimensional array of discrete spaced apart light sources.

Embodiment 24 is the display system of Embodiment 23, where the backlight further includes a microstructured film disposed between the pixelated display surface and the two-dimensional array of discrete spaced apart light sources.

Embodiment 25 is the display system of Embodiment 24, where the microstructured film is a light redirecting film according to any one of Embodiments 18 to 20.

Embodiment 26 is the display system of Embodiment 23, where the backlight is further characterized according to any one of Embodiments 1 to 17.

Embodiment 27 is the backlight of any one of Embodiments 1 to 17, where the first microstructured film is a light redirecting film according to any one of Embodiments 18 to 20.

If the use of "about" as applied to quantities expressing feature sizes, amounts, and physical properties is not otherwise clear to one of ordinary skill in the art in the context in which it is used and described in the present description, "about" will be understood to mean within 10 percent of the specified value. A quantity given as about a specified value can be precisely the specified value. For example, if it is not otherwise clear to one of ordinary skill in the art in the context in which it is used and described in the present description, a quantity having a value of about 1, means that the quantity has a value between 0.9 and 1.1, and that the value could be 1.

All references, patents, and patent applications referenced in the foregoing are hereby incorporated herein by reference in their entirety in a consistent manner. In the event of inconsistencies or contradictions between portions of the incorporated references and this application, the information in the preceding description shall control.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A backlight for providing uniform illumination to a display surface disposed on the backlight, the backlight comprising:
    a plurality of discrete spaced apart light sources configured to illuminate a plurality of non-overlapping illumination zones in the display surface in a one-to-one correspondence relationship; and
    a first microstructured film disposed on the plurality of light sources, such that when the display surface is disposed on the first microstructured film and the light sources are energized, at least 80% of light emitted by each light source illuminates a corresponding illumination zone in the display surface, and a luminous intensity distribution across the plurality of the illumination zones has an average I and a standard deviation S, S/I<1, wherein the first microstructured film comprises a plurality of substantially parallel spaced apart structures extending along a first direction and arranged side by side along an orthogonal second direction on a substrate, the structures facing away from the plurality of light sources, each structure comprising opposing curved facets meeting at a peak, the peak extending along the first direction, such that in a cross-section of the first microstructured film in a plane substantially perpendicular to the first direction:
    an average lateral spacing between neighboring peaks of the structures is P; and
    an average lateral spacing between neighboring bases of the structures is W, $0.1 \leq W/P \leq 0.2$.

2. The backlight of claim 1, wherein the display surface is a pixelated surface comprising a plurality of pixels, each illumination zone including between 200 and 1000 pixels.

3. The backlight of claim 1, wherein each light source in the plurality of plurality of discrete spaced apart light sources is placed directly behind and faces the first microstructured film.

4. The backlight of claim 1, wherein an average lateral spacing between the light sources is S1, an average lateral spacing between the illumination zones is S2, $S2/S1 \leq 10$.

5. The backlight of claim 1, wherein the plurality of light sources has a total emission area E, a total area of the first microstructured film is A, $0.9 < A/E < 2$.

6. The backlight of claim 1, wherein an average lateral spacing between adjacent illumination zones is S2, and average lateral dimension of the illumination zones is S3, $S2/S3 \leq 0.1$.

7. The backlight of claim 1, such that when the display surface is disposed on the first microstructured film and the light sources are energized, a luminous intensity distribution across each illumination zone has an average Iz and a standard deviation Sz, Sz/Iz<0.8.

8. The backlight of claim 1, wherein in the plane substantially perpendicular to the first direction, an average of best-fit radii of curvature to the curved facets of the structures is R, $0.6 \leq R/P \leq 1.1$.

9. The backlight of claim 1, wherein the structures have an index of refraction n1, the substrate has an index of refraction n2, $n1 \geq 1.5$, $n1-n2 \geq 0.02$.

10. A light redirecting film, comprising:
    a plurality of substantially parallel spaced apart structures extending along a first direction and arranged side by side along an orthogonal second direction on a substrate, each structure comprising opposing curved facets meeting at a peak, the peak extending along the first direction, such that in a cross-section of the light redirecting film in a plane substantially perpendicular to the first direction:
    an average lateral spacing between neighboring peaks of the structures is P;
    an average lateral spacing between neighboring bases of the structures is W, $0.1 \leq W/P \leq 0.2$; and
    an average of best-fit radii of curvature to the curved facets of the structures is R, $0.6 \leq R/P \leq 1.1$,
    wherein the structures have an index of refraction n1, the substrate has an index of refraction n2, $n1 \geq 1.5$, $n1-n2 \geq 0.02$.

11. The light redirecting film of claim 10, wherein $15 \leq R \leq 25$ micrometers.

12. The light redirecting film of claim 10, wherein in the cross-section of the light redirecting film in the plane substantially perpendicular to the first direction, a line drawn from the peak of each structure to an end of a base of the structure makes an angle with the base in a range from about 30 degrees to about 60 degrees.

13. A backlight for providing uniform illumination to a display surface disposed on the backlight, the backlight comprising:
    a plurality of discrete spaced apart light sources configured to illuminate a plurality of non-overlapping illumination zones in the display surface in a one-to-one correspondence relationship; and
    the light redirecting film of claim 10 disposed on and facing the plurality of light sources, such that when the display surface is disposed on the light redirecting film and the light sources are energized, at least 80% of light emitted by each light source illuminates a corresponding illumination zone in the display surface, and a luminous intensity distribution across the plurality of the illumination zones has an average I and a standard deviation S, S/I<1.

14. A display system comprising:
    a pixelated display surface comprising a plurality of pixels and a plurality of non-overlapping illumination zones, each illumination zone including at least 10 of the pixels;
    a two-dimensional array of discrete spaced apart light sources disposed behind the display surface, each light source in a one-to-one correspondence with one of the illumination zones;
    a light redirecting film disposed between the display surface and the two-dimensional array of discrete spaced apart light sources, the light redirecting film comprising a plurality of substantially parallel spaced apart structures extending along a first direction and arranged side by side along an orthogonal second direction on a substrate, the structures facing away from the two-dimensional array of discrete spaced apart light sources, each structure comprising opposing curved facets meeting at a peak, the peak extending along the first direction, such that in a cross-section of the light redirecting film in a plane substantially perpendicular to the first direction: an average lateral spacing between neighboring peaks of the structures is P; and an average lateral spacing between neighboring bases of the structures is W, $0.1 \leq W/P \leq 0.2$; and a controller for individually addressing each pixel and for individually energizing each light source, such that when energized, at least 80% of light emitted by each light source illuminates the illumination zone corresponding to the light source.

15. The display system of claim 14, wherein in the plane substantially perpendicular to the first direction, an average of best-fit radii of curvature to the curved facets of the structures is R, $0.6 \leq R/P \leq 1.1$.

16. The display system of claim 14, wherein the structures have an index of refraction n1, the substrate has an index of refraction n2, $n1 \geq 1.5$, $n1-n2 \geq 0.02$.

17. The backlight of claim 1, wherein the first microstructured film further comprises an optical diffuser for diffusing light emitted by the plurality of light sources.

18. The backlight of claim 1, further comprising a second microstructured film disposed on the first microstructured film, the first microstructured film disposed between the second microstructured film and the plurality of light sources.

* * * * *

UNITED STATES PATENT AND TRADEMARK OFFICE
CERTIFICATE OF CORRECTION

| | | |
|---|---|---|
| PATENT NO. | : 11,175,533 B2 | Page 1 of 1 |
| APPLICATION NO. | : 17/041028 | |
| DATED | : November 16, 2021 | |
| INVENTOR(S) | : Gary Boyd | |

It is certified that error appears in the above-identified patent and that said Letters Patent is hereby corrected as shown below:

In the Claims

<u>Column 13</u>
Line 61, In Claim 6, before "average lateral dimension", insert --an--.

Signed and Sealed this
Twenty-sixth Day of April, 2022

*Katherine Kelly Vidal*

Katherine Kelly Vidal
*Director of the United States Patent and Trademark Office*